US011956662B2

(12) United States Patent
Nakahira et al.

(10) Patent No.: US 11,956,662 B2
(45) Date of Patent: Apr. 9, 2024

(54) WIRELESS COMMUNICATION SYSTEM, WIRELESS COMMUNICATION METHOD, AND WIRELESS STATION DEVICE

(71) Applicant: Nippon Telegraph and Telephone Corporation, Tokyo (JP)

(72) Inventors: Toshiro Nakahira, Musashino (JP); Hirantha Abeysekera, Musashino (JP); Tomoki Murakami, Musashino (JP); Koichi Ishihara, Musashino (JP); Takafumi Hayashi, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 322 days.

(21) Appl. No.: 17/610,785

(22) PCT Filed: Jun. 10, 2019

(86) PCT No.: PCT/JP2019/022984
§ 371 (c)(1),
(2) Date: Nov. 12, 2021

(87) PCT Pub. No.: WO2020/250287
PCT Pub. Date: Dec. 17, 2020

(65) Prior Publication Data
US 2022/0248252 A1   Aug. 4, 2022

(51) Int. Cl.
*H04W 28/02* (2009.01)
*H04W 16/10* (2009.01)
(Continued)

(52) U.S. Cl.
CPC ....... *H04W 28/0231* (2013.01); *H04W 16/10* (2013.01); *H04W 84/12* (2013.01); *H04W 92/12* (2013.01)

(58) Field of Classification Search
CPC . H04W 28/0231; H04W 16/10; H04W 84/12; H04W 92/12
See application file for complete search history.

(56) References Cited

U.S. PATENT DOCUMENTS

| 2015/0289142 | A1  | 10/2015 | Abeysekera et al. |
| 2015/0304080 | A1* | 10/2015 | Yi ........................ H04L 5/0053 370/329 |
| 2016/0302217 | A1* | 10/2016 | Yang ..................... H04W 16/14 |

FOREIGN PATENT DOCUMENTS

WO   WO 2014/073706   5/2014

OTHER PUBLICATIONS

Abeysekera et al., "Multi-interface Control Scheme on Strategy Management Architecture for Wireless resource optimization (WiSMA)," Lecture proceedings of the 2018 communication society conference of IEICE, Sep. 11, 2018, p. 207, 3 pages (with English Translation).

(Continued)

*Primary Examiner* — Benjamin H Elliott, IV
*Assistant Examiner* — Nevena Zecevic Sandhu
(74) *Attorney, Agent, or Firm* — Fish & Richardson P.C.

(57) ABSTRACT

A wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, and setting frequency channels in the plurality of wireless modules, the wireless stations being notified of the frequency channels by the control device, and the control device includes means for calculating a frequency channel of each wireless module of each wireless station based on the environment information collected from (Continued)

each wireless station, following a control guideline that is determined in advance, and notifying the wireless stations of the frequency channels.

6 Claims, 6 Drawing Sheets

(51) Int. Cl.
*H04W 84/12* (2009.01)
*H04W 92/12* (2009.01)

(56) References Cited

OTHER PUBLICATIONS

Morikura et al., "802.11 High Speed Wireless LAN Textbook Revised 3rd Edition," Impress R & D, Mar. 27, 2008, pp. 6-9, 5 pages (with English Translation).

* cited by examiner

WIRELESS COMMUNICATION SYSTEM, WIRELESS COMMUNICATION METHOD, AND WIRELESS STATION DEVICE

CROSS-REFERENCE TO RELATED APPLICATIONS

This application is a National Stage application under 35 U.S.C. § 371 of International Application No. PCT/JP2019/022984, having an International Filing Date of Jun. 10, 2019. The disclosure of the prior application is considered part of the disclosure of this application, and is incorporated in its entirety into this application.

TECHNICAL FIELD

The present invention relates to a wireless communication system, a wireless communication method, and a wireless station device that improve reduction in throughput that is caused by CSMA/CA (Carrier Sense Multiple Access with Collision Avoidance) control of each wireless station in an environment that is crowded with wireless LANs (Local Area Networks).

BACKGROUND ART

In recent years, wireless LANs of IEEE 802.11 standards are widely used not only in companies and public spaces but also in ordinary homes due to the spread of wireless terminals such as notebook personal computers and smartphones that are portable and have high performance. Wireless LANs of the IEEE 802.11 standards include wireless LANs of IEEE 802.11b/g/n standards, which use the 2.4 GHz band, and wireless LANs of IEEE 802.11a/n/ac standards, which use the 5 GHz band.

In wireless LANs of IEEE 802.11b standards and IEEE 802.11g standards, 13 channels are prepared between 2400 MHz and 2483.5 MHz at intervals of 5 MHz. However, when a plurality of channels are used at the same place, the maximum number of channels that can be simultaneously used is three or may be four, if the channels are used such that spectrums do not overlap to avoid interference.

In wireless LANs of IEEE 802.11a standards, a total of 19 channels are defined in the case of Japan, the 19 channels being constituted by 8 channels and 11 channels that do not overlap each other and are respectively defined between 5170 MHz and 5330 MHz and between 5490 MHz and 5710 MHz. Note that the bandwidth per channel is fixed to 20 MHz in the IEEE 802.11a standards.

The maximum transmission speed of a wireless LAN is 11 Mbps in the case of the IEEE 802.11b standards and is 54 Mbps in the case of the IEEE 802.11a standards and the IEEE 802.11g standards. However, the transmission speed referred to here is the transmission speed in a physical layer. Actually, a transmission efficiency in a MAC (Medium Access Control) layer is about 50 to 70%, and therefore an upper limit value of actual throughput is about 5 Mbps in the case of the IEEE 802.11b standards and is about 30 Mbps in the case of the IEEE 802.11a standards and the IEEE 802.11g standards. Also, the transmission speed is further reduced if wireless stations that transmit information increase.

On the other hand, with the spread of FTTH (Fiber To The Home) using optical fibers at homes, such as the 100 Base-T interface of Ethernet (registered trademark), high-speed lines that enable transmission as fast as 100 Mbps to 1 Gbps are widely provided in wired LANs, and there are demands for a further increase in the transmission speed in wireless LANs.

Therefore, in IEEE 802.11n standards completed in 2009, the channel bandwidth that had been fixed to 20 MHz was enlarged up to 40 MHz, and introduction of a spatial multiplexing transmission technology (MIMO: Multiple Input Multiple Output) was determined. If transmission and reception are performed by applying all functions defined in the IEEE 802.11n standards, a communication speed of up to 600 Mbps can be realized in a physical layer.

Furthermore, in IEEE 802.11ac standards completed in 2013, it was determined to enlarge the channel bandwidth to 80 MHz or up to 160 MHz (or 80+80 MHz) and introduce a multi-user MIMO (MU-MIMO) transmission method to which space division multiple access (SDMA) is applied. If transmission and reception are performed by applying all functions defined in the IEEE 802.11ac standards, a communication speed of up to about 6.9 Gbps can be realized in a physical layer.

Also, in IEEE 802.11ax standards that are currently being established, OFDMA (Orthogonal Frequency Division Multiple Access) that enables transmission and reception of frames by dividing the above-described channels of 20 MHz, 40 MHz, 80 MHz, 160 MHz, and 80+80 MHz into smaller sub channels will be defined. If OFDMA is used, transmission can be simultaneously performed by a plurality of wireless stations in each resource unit by dividing the above-described channels into smaller sub channels. Furthermore, in the IEEE 802.11ax standards, a function that increases communication opportunities while suppressing interference from another cell in a surrounding region through carrier sense threshold (CCA threshold) control will be defined.

Wireless LANs of the IEEE 802.11 standards operate in the 2.4 GHz frequency band or the 5 GHz frequency band, for which a license is unnecessary, and accordingly, each wireless base station of the IEEE 802.11 standards selects and uses a frequency channel from frequency channels that can be supported by the wireless base station, when forming a wireless LAN cell (BSS: Basic Service Set).

The cell is operated by writing the channel used in the cell, set values of the bandwidth and parameters other than the bandwidth, and other parameters that can be supported by the wireless base station, in a Beacon frame that is periodically transmitted or a Probe response frame that is transmitted in response to a Probe Request frame received from a wireless terminal, for example, and transmitting the frame in the frequency channel that is determined to be used, to notify wireless terminals under the coverage of the wireless base station and other wireless stations in a surrounding region.

There are the following four methods for selecting and setting the frequency channel, the bandwidth, and other parameters in a wireless base station.

(1) Method of using default parameter values as is, which are set by the manufacturer of the wireless base station.
(2) Method of using values that are manually set by a user who operates the wireless base station.
(3) Method of autonomously selecting and setting parameter values based on wireless environment information that is detected by each wireless base station when starting operation.
(4) Method of setting parameter values that are determined by a central control station such as a wireless LAN controller.

Also, the number of channels that can be simultaneously used at the same place is dependent on the bandwidth of channels that are used for communication, and is 3 in the case of wireless LANs in the 2.4 GHz band, and is 2, 4, 9, or 19 in the case of wireless LANs in the 5 GHz band, and accordingly, when a wireless LAN is actually introduced, a wireless base station needs to select a channel that is to be used in the BSS of the wireless base station (NPL 1).

If the channel bandwidth is enlarged to 40 MHz, 80 MHz, 160 MHz, or 80+80 MHz, the number of channels that can be simultaneously used at the same place in the 5 GHz band, which is 19 if the channel bandwidth is 20 MHz, is reduced to 9, 4, or 2. That is, the number of channels that can be used is reduced as the channel bandwidth is increased.

In an environment that is crowded with wireless LANs and in which the number of BSSs is greater than the number of channels that can be used, a plurality of BSSs use the same channel (OBSS: Overlapping BSS). Therefore, autonomous and distributed access control is used in wireless LANs to transmit data through carrier sensing only when a channel is vacant, by using CSMA/CA (Carrier Sense Multiple Access with Collision Avoidance).

Specifically, a wireless station for which a transmission request occurred initially performs carrier sensing only for a predetermined sensing period (DIFS: Distributed Inter-Frame Space) to monitor the state of a wireless medium, and performs random back-off if there is no transmission signal from another wireless station during the period. The wireless station continuously performs carrier sensing during the random back-off period as well, and obtains a right to use a channel if there is no transmission signal from another wireless station in this period as well. Note that transmission and reception performed by another wireless station is determined based on whether or not a signal that is greater than a preset carrier sense threshold is received. The wireless station that obtained the right to use can transmit data to other wireless stations in the same BSS and receive data from these wireless stations. If such CSMA/CA control is performed, throughput is reduced in an environment crowded with wireless LANs that use the same channel, because the frequency of the channel becoming busy is increased due to carrier sensing. Therefore, it is important to monitor a surrounding environment, select an appropriate channel, and select a transmission power value and a carrier sense threshold that enable simultaneous transmission and reception.

CITATION LIST

Non Patent Literature

[NPL 1] Supervised by Masahiro Morikura and Shuji Kubota, "802.11 HIGH-SPEED WIRELESS LAN TEXTBOOK", $3^{rd}$ revised edition, Impress R&D, March 2008

SUMMARY OF THE INVENTION

Technical Problem

Methods for selecting the parameters described above, such as 2.4 GHz or 5 GHz, which is an operation frequency band of wireless base stations, and channels that are used in the operation frequency band are not defined in the IEEE 802.11 standards, and therefore each vendor adopts unique methods.

Also, wireless stations select the parameters described above in an autonomous and distributed manner, and therefore the parameters cannot be optimized in the entire system, and there is a problem in that user quality is significantly degraded particularly in an environment where the number of wireless stations is large.

Furthermore, wireless stations in which a plurality of wireless modules are installed are increasing in recent years. The aim is to enlarge a band that is used and increase user throughput in a service area by installing a plurality of wireless modules in the same housing and separately using frequency bands and channels.

However, if frequency bands and channels that are respectively used by the installed wireless modules are not appropriately set, the wireless modules interfere not only with another wireless station in a surrounding region but also with each other, and an expected service cannot be provided.

An object of the present invention is to provide a wireless communication system, a wireless communication method, and a wireless station device that can appropriately set operation frequency channels of a plurality of wireless modules that are installed in wireless stations, to improve throughput of the entire system and provide a high-quality wireless environment to each user.

Means for Solving the Problem

A first invention is a wireless communication system in which wireless stations perform transmission, a plurality of wireless modules that are operated in a shared frequency band being installed in the wireless stations, wherein the wireless stations each include means for notifying a control device of environment information that includes capacity information regarding the wireless station and information regarding a surrounding wireless environment, and setting frequency channels in the plurality of wireless modules, the wireless stations being notified of the frequency channels by the control device, and the control device includes means for calculating a frequency channel of each wireless module of each wireless station based on the environment information collected from each wireless station, following a control guideline that is determined in advance, and notifying the wireless stations of the frequency channels.

A second invention is a wireless communication method in which wireless stations perform transmission, a plurality of wireless modules that are operated in a shared frequency band being installed in the wireless stations, wherein the wireless stations each notify a control device of environment information that includes capacity information regarding the wireless station and information regarding a surrounding wireless environment, and set frequency channels in the plurality of wireless modules, the wireless stations being notified of the frequency channels by the control device, and the control device calculates a frequency channel of each wireless module of each wireless station based on the environment information collected from each wireless station, following a control guideline that is determined in advance, and notifies the wireless stations of the frequency channels.

A third invention is a wireless station device in which a plurality of wireless modules that are operated in a shared frequency band are installed, the wireless station device including: means for notifying a control device of environment information that includes capacity information regarding the wireless station and information regarding a surrounding wireless environment; and means for inputting and setting frequency channels of the plurality of wireless modules that are calculated by the control device based on the environment information collected from each wireless station, following a control guideline that is determined in advance.

Effects of the Invention

According to the present invention, operation frequency channels of a plurality of wireless modules installed in wireless stations can be appropriately set, and therefore it is possible to improve throughput of the entire system and provide a high-quality wireless environment to each user.

DESCRIPTION OF EMBODIMENTS

Figure 1:
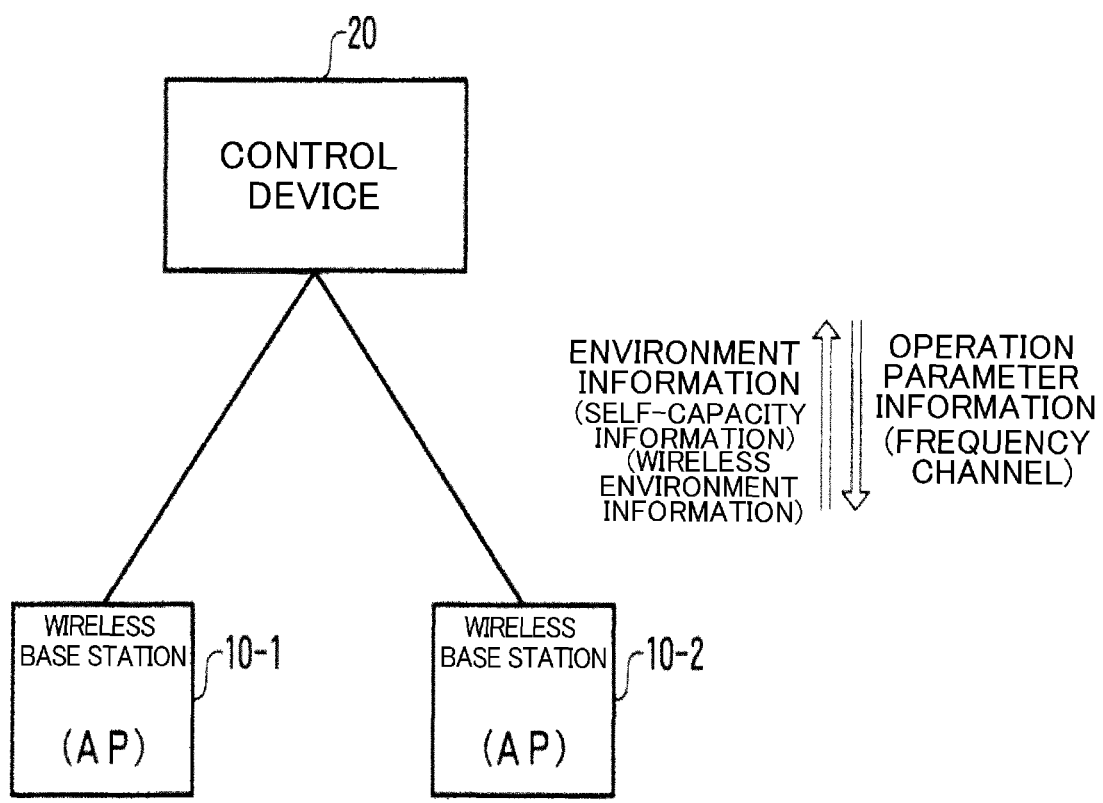
FIG. 1 is a diagram showing an example configuration of a wireless communication system according to the present invention.

FIG. 1 shows an example configuration of a wireless communication system according to the present invention. Here, frequency channel control of wireless base stations (AP) that are wireless stations in which a plurality of wireless modules (RFs) operated in a shared frequency band are installed will be described as an example.

In FIG. 1, the wireless communication system has a configuration in which a plurality of wireless base stations (APs) 10-1 and 10-2 are connected to a control device 20. Each of the APs 10-1 and 10-2 includes one or more wireless modules (RFs) and communicates with wireless terminals (not shown) that are under the coverage of the AP. The APs 10-1 and 10-2 each notify the control device 20 of environment information and operate the RFs based on operation parameter information that is given from the control device 20. The operation parameter information referred to herein is frequency channels that are respectively used by the RFs.

Figure 2:
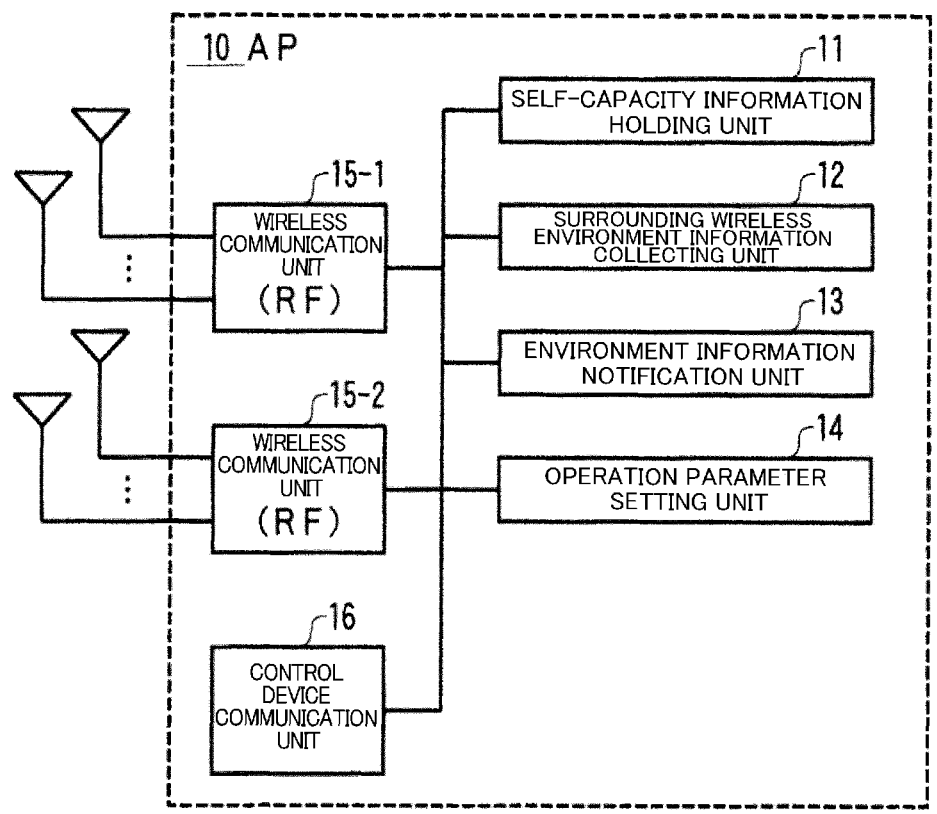
FIG. 2 is a diagram showing an example configuration of a wireless base station (AP) 10.

FIG. 2 shows an example configuration of a wireless base station (AP) 10. In FIG. 2, the AP 10 is constituted by a self-capacity information holding unit 11, a surrounding wireless environment information collecting unit 12, an environment information notification unit 13, an operation parameter setting unit 14, wireless communication units 15-1 and 15-2 including RFs, and a control device communication unit 16. The self-capacity information holding unit 11 holds capacity information regarding each RF that is installed. The surrounding wireless environment information collecting unit 12 collects information regarding a surrounding wireless environment. The environment information notification unit 13 notifies the control device 20 of environment information that includes the capacity information described above and the information regarding the surrounding wireless environment described above. The operation parameter setting unit 14 sets operation parameters (frequency channels) of respective RFs based on operation parameter information that is given from the control device 20. The control device communication unit 16 performs wired or wireless communication with the control device 20.

Figure 3:
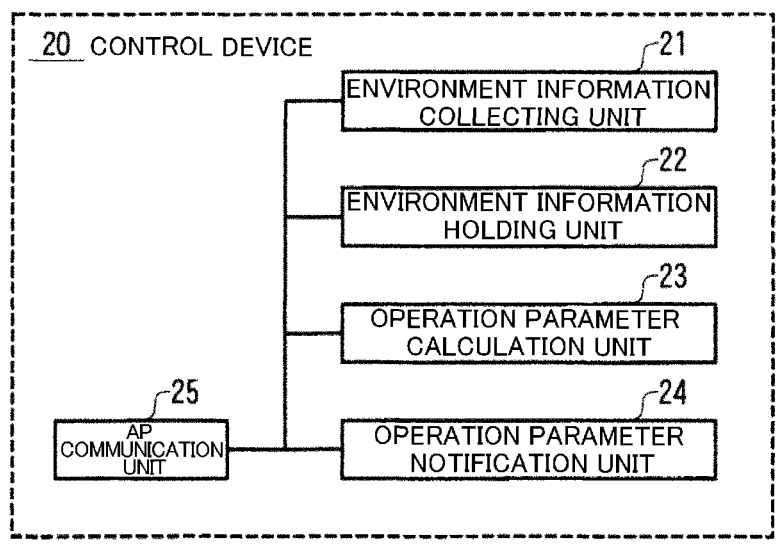
FIG. 3 is a diagram showing an example configuration of a control device 20.

FIG. 3 shows an example configuration of the control device 20. In FIG. 3, the control device 20 is constituted by an environment information collecting unit 21, an environment information holding unit 22, an operation parameter calculation unit 23, an operation parameter notification unit 24, and an AP communication unit 25. The environment information collecting unit 21 collects environment information that is given from each AP 10. The environment information holding unit 22 holds the collected environment information. The operation parameter calculation unit 23 determines an operation parameter (a frequency channel) of each RF installed in each AP 10 based on the collected and held environment information. The operation parameter notification unit 24 gives a notification of the determined operation parameter (frequency channel). The AP communication unit 25 performs wired or wireless communication with each AP 10.

Figure 5:
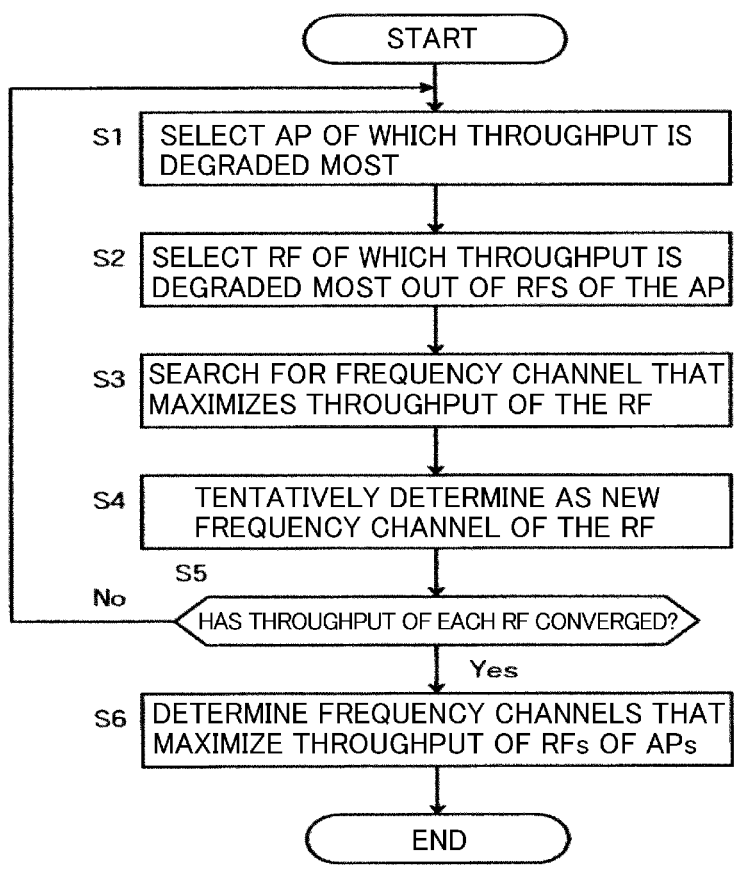
FIG. 5 is a flowchart showing a control flow of the control device 20 in the present invention.

FIG. 5 shows a control flow of the control device 20 in the present invention. Note that the control flow is executed by the operation parameter calculation unit 23 of the control device 20.

In FIG. 5, when the control flow is started, an AP of which throughput is degraded most is selected based on throughput information regarding each wireless module (RF) of each wireless base station (AP), which is given as environment information from each AP (step S1). Then, an RF of which throughput is degraded most is selected from a plurality of RFs that are installed in the selected AP (step S2). A frequency channel that maximizes the throughput of the RF is searched for (step S3), and a new frequency channel of the RF is tentatively determined (step S4). The processing in steps S1 to S4 described above is repeated, and if it is determined that throughput of each RF has converged, the repeated processing is ended (step S5), and frequency channels that maximize throughput of the RFs installed in the respective APs are determined (step S6).

Figure 4:
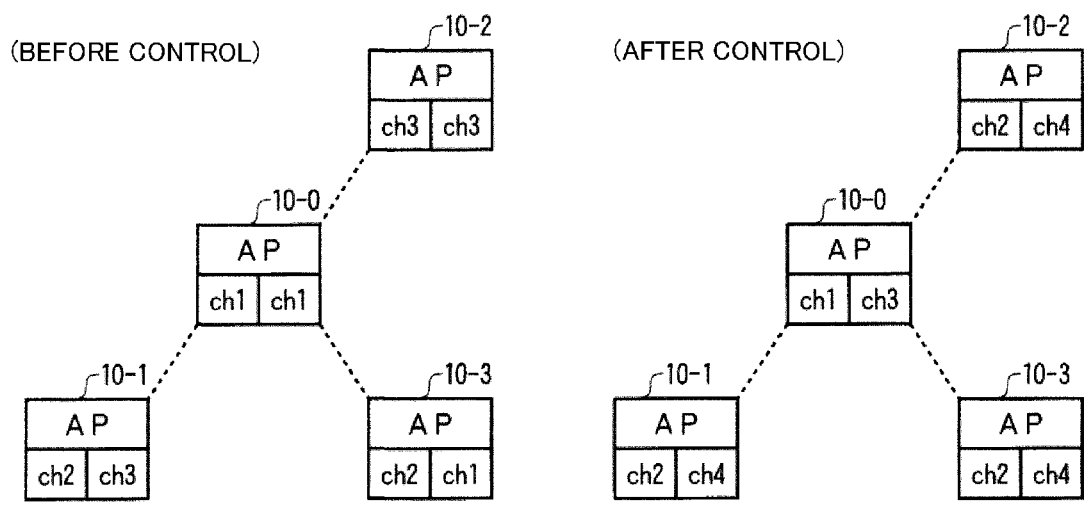
FIG. 4 is a diagram showing an example of control performed in the present invention.

Here, an example of control of frequency channels before and after execution of the control flow is shown in FIG. 4. Assume that two RFs are installed in each of APs 10-0 to 10-3, and the AP 10-0 interferes with each of the APs 10-1 to 10-3 (indicated by dashed lines in the drawing). Before the control flow is executed, throughputs of the APs 10-0 and 10-2 in which the two RFs operate in the same frequency channel are degraded. In contrast, as a result of the control flow being executed, ch1 and ch3 are allocated to the two RFs of the AP 10-0, and ch2 and ch4 are allocated to the two RFs of each of the APs 10-1 to 10-3. As a result, throughput is improved.

Figure 6:
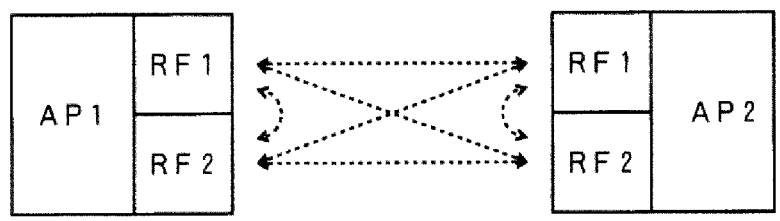
FIG. 6 is a diagram showing an embodiment of the present invention.

FIG. 6 shows an embodiment of the present invention. In the present embodiment, the throughput of the RF in step S3 shown in FIG. 5 is defined as follows.

Throughput=(1/number of interfering RFs)×weight $w$

Here, the weight w is defined as follows.
w=1 (if the interfering RFs are not in the same housing)
w=inter-channel distance/number of frequency channels (if the interfering RFs are in the same housing)
Here, the inter-channel distance is a numeral that indicates how far a frequency channel that is to be allocated to the RF is set apart from a frequency channel that is used by another RF in the same housing, which is an interference source.

According to this definition, throughput of each RF of an AP decreases according to the number of interfering RFs of other APs, and increases according to the inter-channel distance with respect to an interfering RF of the AP. Therefore, frequency channels that are respectively set in RFs of each AP can be set apart from each other as far as possible.

In FIG. 6, an environment is assumed in which two RFs 1 and 2 are installed in each of two APs 1 and 2, the RFs interfere with each other, and channels 36*ch*, 100*ch*, and 104*ch* can be used. Since the number of channels that can be used is three, the number of combinations of channels that are allocated to the total of four RFs is $4^3=64$. Here, in the AP 1 and/or AP 2, combinations of the same frequency channels for the RF 1 and the RF 2 that are in the same housing are unallowable because throughput becomes 0 as a result of the inter-channel distance being 0 and the weight w being 0.

Therefore, throughput is calculated with respect to cases where frequency channels of the following combinations are allocated to (RF 1 of AP 1, RF 2 of AP 1, RF 1 of AP 2, RF 2 of AP 2). Note that calculated values of the throughput are the same even if the order of frequency channels that are allocated to the RF 1 and the RF 2 in an AP is changed, and therefore verification is performed using the following nine patterns.

Pattern 1: (36, 100, 36, 100)
Pattern 2: (36, 100, 36, 104)
Pattern 3: (36, 100, 100, 104)
Pattern 4: (36, 104, 36, 100)
Pattern 5: (36, 104, 36, 104)
Pattern 6: (36, 104, 100, 104)
Pattern 7: (100, 104, 36, 100)
Pattern 8: (100, 104, 36, 104)
Pattern 9: (100, 104, 100, 104)

The inter-channel distance of a combination of 36*ch* and 104*ch* is the largest, and therefore pattern 5 is the optimum pattern of the nine patterns shown above. The second highest throughput is achieved when a combination of 36*ch* and 104*ch* is adopted for one of the APs and a combination of 36*ch* and 100*ch* is adopted for the other AP, and this is the case with patterns 2 and 4.

REFERENCE SIGNS LIST

10 Wireless base station (AP)
11 Self-capacity information holding unit
12 Surrounding wireless environment information collecting unit
13 Environment information notification unit
14 Operation parameter setting unit
15 Wireless communication unit
16 Control device communication unit
20 Control device
21 Environment information collecting unit
22 Environment information holding unit
23 Operation parameter calculation unit
24 Operation parameter notification unit
25 AP communication unit

The invention claimed is:

1. A wireless communication system in which wireless stations are configured to perform transmission, and a plurality of wireless modules are configured to operate in a shared frequency band and are installed in the wireless stations,
wherein each of the wireless stations is configured to notify a control device of environment information that includes capacity information regarding the wireless station and information regarding a surrounding wireless environment, and to set frequency channels in the plurality of wireless modules, the wireless stations being notified of the frequency channels by the control device, and
the control device is configured to calculate a frequency channel of each wireless module of the each wireless station based on the environment information collected from the each wireless station, following a control guideline that is determined in advance, and notify the wireless stations of the frequency channels, wherein calculating the frequency channel of the each wireless module of the each wireless station comprises:
selecting, from the wireless stations that are connected to the control device, a wireless station of which throughput is degraded most, and
reselecting a frequency channel that increases throughput for a wireless module that has the smallest throughput out of a plurality of wireless modules that are installed in the wireless station.

2. The wireless communication system according to claim 1,
wherein, according to the control guideline, throughput that is to be achieved is predicted using a weight w that is determined in advance, based on a frequency channel that is used by another wireless module installed in the wireless station and a frequency channel of another wireless station in a surrounding region.

3. A wireless communication method in which wireless stations perform transmission, a plurality of wireless modules that are operated in a shared frequency band being installed in the wireless stations, the wireless communication method comprising:
each of the wireless stations notifying a control device of environment information that includes capacity information regarding the wireless station and information regarding a surrounding wireless environment, and setting frequency channels in the plurality of wireless modules, the wireless stations being notified of the frequency channels by the control device, and
the control device calculating a frequency channel of each wireless module of the each wireless station based on the environment information collected from the each wireless station, following a control guideline that is determined in advance, and notifying the wireless stations of the frequency channels, wherein calculating the frequency channel of the each wireless module of the each wireless station comprises:
selecting, from the wireless stations that are connected to the control device, a wireless station of which throughput is degraded most, and
reselecting a frequency channel that increases throughput for a wireless module that has the smallest throughput out of a plurality of wireless modules that are installed in the wireless station.

4. The wireless communication method according to claim 3,
wherein, according to the control guideline, throughput that is to be achieved is predicted using a weight w that is determined in advance, based on a frequency channel that is used by another wireless module installed in the wireless station and a frequency channel of another wireless station in a surrounding region.

5. A wireless station device in which a plurality of wireless modules that are operated in a shared frequency band are installed, the wireless station device comprising one or more processors configured to perform operations comprising:

notifying a control device of environment information that includes capacity information regarding the wireless station device and information regarding a surrounding wireless environment; and inputting and setting frequency channels of the plurality of wireless modules that are calculated by the control device based on environment information collected from each wireless station, following a control guideline that is determined in advance, wherein, according to the control guideline, a wireless station of which throughput is degraded most is selected by the control device from wireless stations that are connected to the control device, and a frequency channel that increases throughput is reselected by the control device for a wireless module that has the smallest throughput out of a plurality of wireless modules that are installed in the wireless station.

6. The wireless station device according to claim 5, wherein, according to the control guideline, throughput that is to be achieved is predicted using a weight w that is determined in advance, based on a frequency channel that is used by another wireless module installed in the wireless station and a frequency channel of another wireless station in a surrounding region.

* * * * *